United States Patent
Nijim et al.

(10) Patent No.: US 12,061,934 B1
(45) Date of Patent: Aug. 13, 2024

(54) ADAPTIVE EDGE PROCESSING

(71) Applicant: Cox Communications, Inc., Atlanta, GA (US)

(72) Inventors: Yousef Wasef Nijim, Cumming, GA (US); Anthony Joseph Insinga, Powder Springs, GA (US); Joshua Paul Bernard Sommer, Atlanta, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 672 days.

(21) Appl. No.: 16/941,058

(22) Filed: Jul. 28, 2020

(51) Int. Cl.
*G06F 9/46* (2006.01)
*G06F 9/48* (2006.01)
*G06F 9/50* (2006.01)

(52) U.S. Cl.
CPC .......... *G06F 9/5072* (2013.01); *G06F 9/4881* (2013.01)

(58) Field of Classification Search
CPC .............................. G06F 9/5072; G06F 9/4881
See application file for complete search history.

(56) References Cited

U.S. PATENT DOCUMENTS

| | | | |
|---|---|---|---|
| 2019/0303208 A1* | 10/2019 | Koya | G06F 9/505 |
| 2020/0021537 A1* | 1/2020 | Oliveira | H04L 47/72 |
| 2020/0089520 A1* | 3/2020 | Ravi | H04L 67/568 |
| 2020/0117513 A1 | 4/2020 | Li et al. | |
| 2020/0145337 A1 | 5/2020 | Keating et al. | |
| 2020/0351380 A1* | 11/2020 | Fedorov | H04W 4/70 |
| 2021/0042160 A1* | 2/2021 | Alamouti | G06F 9/5011 |
| 2021/0181739 A1* | 6/2021 | Chen | G06F 11/3013 |

FOREIGN PATENT DOCUMENTS

| | | | | |
|---|---|---|---|---|
| EP | 3591938 A1 * | 1/2020 | | G06F 9/22 |

OTHER PUBLICATIONS

Wang et al, Edge Cloud Offloading Algorithms: Issues, Methods, and Perspectives, 2019, ACM, vol. 52, 23 pages. (Year: 2019).*

\* cited by examiner

*Primary Examiner* — Diem K Cao
(74) *Attorney, Agent, or Firm* — Merchant & Gould P.C.

(57) ABSTRACT

Aspects of the present disclosure provide for adaptively allocating processing operations according to an edge-only processing mode, a hybrid edge-cloud processing mode, and/or cloud-only processing mode, but are not so limited. In one aspect, the disclosure describes adaptively managing processing of applications or application modules by using machine learning in part to direct how the processing operations are to be performed whether using edge-only resources, hybrid edge-cloud resources, and/or cloud-only resources. Other aspects are described in detail herein.

20 Claims, 8 Drawing Sheets

US 12,061,934 B1

ADAPTIVE EDGE PROCESSING

BACKGROUND

Cloud computing has become a popular platform due in part to enabling users to quickly launch online applications and access application data at any time, from any location, provided there is an Internet connection. However, latency and bandwidth constraints in cloud computing poses a major technical challenge for application developers and online providers attempting to provide real-time or near real-time application interactivity. As more and more devices are connected to the cloud, the cloud computing paradigm becomes less ideal due in part to the strain and congestion resulting from so many connections and the bandwidth consumption resulting from the back and forth communications.

However, cloud computing, which may inherently introduce more latency, enables users to store applications and data from any location in the cloud (e.g., a datacenter). Edge computing is another type of computing environment which attempts to provide solutions that facilitate data processing at or near a source of data generation. Edge computing typically allows end-users to have faster interaction with the data by reducing latency. However, edge computing functionality can be a technically difficult challenge to incorporate with a cloud network. Accordingly, the present disclosure provides at least one technical solution to the technical problems associated with cloud and edge communication networks.

SUMMARY

Aspects of the present disclosure provide a system, method, and computer readable storage media to adaptively allocate processing operations according to an edge-only processing mode, a hybrid edge-cloud processing mode, and/or cloud-only processing mode, but are not so limited. A system of an embodiment operates to adaptively manage processing of applications or application modules by using machine learning in part to direct how the processing operations are to be performed whether using edge-only resources, hybrid edge-cloud resources, and/or cloud-only resources. A method of an embodiment adaptively manages processing of applications or application modules by using machine learning in part to direct how the processing operations are to be performed whether using edge-only resources, hybrid edge-cloud resources, and/or cloud-only resources. Other aspects are described in detail herein and the summary provides a brief overview of the technology used and employed.

The details of one or more aspects are set forth in the accompanying drawings and description below. Other features and advantages will be apparent from a reading of the following detailed description and a review of the associated drawings. It is to be understood that the following detailed description is not intended to be restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
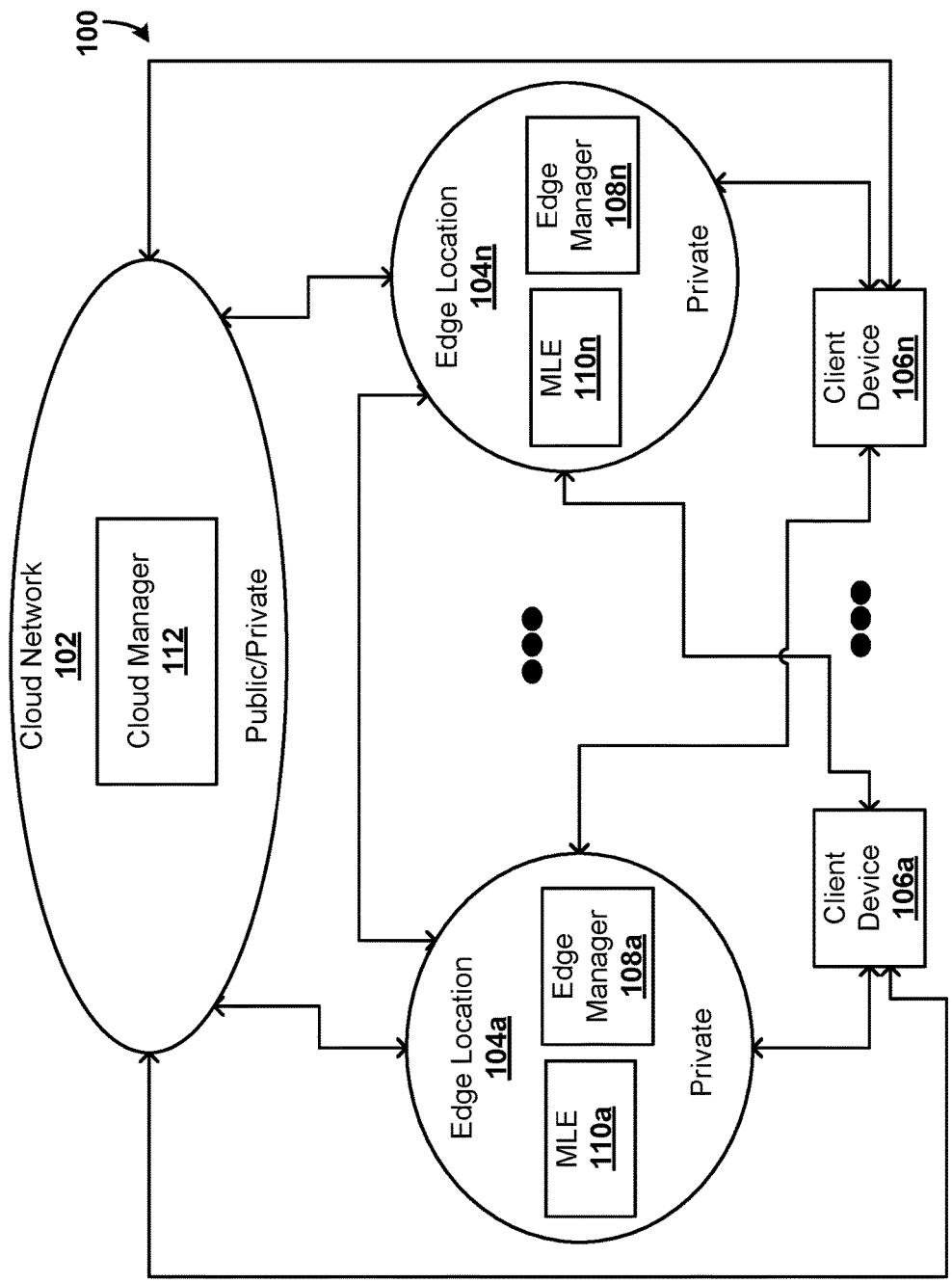
FIG. 1 is a block diagram of an example communication environment in which aspects of the present disclosure can be implemented.

FIG. 1 is a block diagram of an example communication environment 100 where adaptive allocation of processing of applications or application modules can be performed by using machine learning in part to direct how the processing operations are to be performed whether using edge-only resources, hybrid edge-cloud resources, and/or cloud-only resources. Communication environment 100 includes a cloud network 102 in communication with a plurality of edge locations 104a-104n (generally 104) and client devices 106a-106n (generally 106). For example, communication environment 100 may be representative of a smart city that connects users via public/private access (e.g., an Internet connection) to the cloud network 102 and/or private connections to one or more of the edge locations 104a-104n.

As discussed further below, communication environment 100 can include one or more edge managers 108a-108n (generally 108) and/or machine learning engines 110a-110n (generally 110) that operate in conjunction with each edge location 104 and the cloud network 102 to manage application and/or other processing operations using resources of the cloud network 102, resources at edge locations 104a-104n, and/or some combination of cloud and edge resources. While shown as being located with the edge locations 104, an edge manager 108 may be located in the cloud network 102 as well.

As shown in FIG. 1, and as one implementation example, edge locations 104a-104n are typically positioned in closer proximity to the client devices 106a-106n as compared to resources of the cloud network 102. For example, edge locations 104a-104n may be about 500 m to about 3 km from a client device 106, such as being integrated as part of a network node, headend location, etc. For example, edge processing resources (e.g., server machines and virtual servers) can be located at a network node, such as an external cabinet for example, housing the machine learning engine, processing, control, storage and other application processing resources at the edge location. As another example, edge processing resources can be located at a headend location of a service provider that includes a machine learning engine as well as the transmission, control, distribution, storage, and other processing resources. Edge manager 108 and/or cloud manager 112 can adaptively and cooperatively, based in part on machine learning output, manage communications and processing to and from cloud network 102, such as whether an edge location 104 should be used for processing operations or whether the edge location 104 is at peak capacity and another edge location 104 and/or the cloud network 102 should be used for processing operations.

Each machine learning engine 110 can include a machine learning algorithm (e.g., Logistic Regression (LR), Naive-Bayes, Random Forest (RF), neural networks (NN), matrix factorization, Support Vector Machines (SVM), decision tree, etc.) that operates to provide an output determination as to whether to perform application processing or other operations using edge resources, cloud resources, or some combination of edge and cloud resources. Machine learning algorithms may implement a decision tree that includes one or more weighted parameters or variables that can be used to determine where to perform application processing or other operations such as an edge location 104, cloud network 102, or some combination thereof. For example, output from the machine learning algorithm can be compared to an operational threshold to determine whether to allocate processing operations to one or more edge locations 104, cloud network 102, or some combination thereof.

Machine learning engine 110 can be run periodically (e.g., daily, hourly, etc.) and the edge management 218 and triggering module 220 can use the output to update the traffic flow and resource allocations. Machine learning engine 110 output can be used to manage which customers, devices, subscriptions, applications, etc. are to use certain edge and/or cloud resources. Machine learning engine 110 of one embodiment employs a machine learning algorithm that includes a plurality of weighted parameters that include, but are not limited to, customer subscription type, customer location, a type of application parameter, a usage parameter, a time latency parameter, a power consumption parameter, an urgency of request parameter and/or timing of request parameter, an estimated cloud travel time parameter and/or processing cloud time parameter, and/or a security parameter. The cloud network 102 can also include one or more machine learning engines and associated algorithms that may include more or fewer weighted parameters than employed at an edge location.

In some cases, a weighted parameter will have a zero value and will not contribute to a final processing determination output provided by machine learning engine 110. It is also possible for parameters to change from a weighted value of zero to a different value dependent upon the actual use scenario. For example, IoT device applications and gaming applications tend to require more processing and/or memory resources as compared to other applications and processing, communication, protocol, etc. operations for these types of applications may be moved to an edge location 104 to improve responsiveness and reduce operational impact on resources of the cloud network 102. Various business rules can be implemented to automatically perform an action based on machine learning output, such as identifying an edge location 104 to process a certain application module, distributing application processing between edge and cloud resources, overriding processing resource allocations, etc.

The type of application parameter corresponds to a type of application being used that will be using the edge, cloud, or combined resources to run the application (e.g., virtualized applications, gaming applications, video processing applications, smart city and vehicle applications, IoT applications, etc.). Machine learning engine 110 can utilize the type of application parameter, along with one or more other parameters to drive the machine learning algorithm to provide edge/cloud resource allocation determinations as part of determining whether to allocate processing operations to one or more edge locations 104, cloud network 102, or some combination thereof. Edge manager 108 and/or cloud manager 112 can access one or more business rules that operate in part to override the output of the machine learning engine 110 to force the processing of certain application types at the edge location 104 and/or the cloud network 102. For example, modules of a gaming application can be placed at edge locations that are within a defined proximity to the corresponding online users to reduce latency and congestion as compared to using cloud processing only to facilitate game play.

The usage parameter corresponds to how an application is being used in real-time and according to historical data. For example, gaming and IoT applications can be high usage applications including large volumes of connections and back and forth communications from subscriber locations to the cloud network 102; which can increase exponentially as users are added to an online gaming event or as additional IoT devices are incorporated. Depending on a usage business rule, certain gaming or IoT modules may be pushed to an edge location 104. For example, certain IoT processing operations can be moved to the edge location 104 for processing according to the amount of usage for IoT devices located within a range of street addresses, connected to a common network node, located within a radial boundary, within a city or county etc. Machine learning engine 110 can utilize the usage parameter in part to drive the edge/cloud resource allocation determination and may include using a usage threshold as part of determining whether to allocate processing operations to one or more edge locations 104, cloud network 102, or some combination thereof.

The time latency parameter corresponds to a total amount of time that includes: an upload time or amount of time that it takes for a communication to reach the cloud network 102 from a client device 106, an amount a processing time at the cloud network 102, and a download time or an amount of time that it takes for a communication to reach the client device 106 from the cloud network 102 after the cloud processing. Machine learning engine 110 can utilize the time latency parameter in part to drive the edge/cloud resource allocation determination and may include using a latency threshold as part of determining whether to allocate processing operations to one or more edge locations 104, cloud network 102, or some combination thereof. In some aspects, critical components, containers, or modules can be placed and/or executed at one or more edge locations as part of minimizing an amount of latency as much as possible as well as optimizing any other machine learning parameter. Containers allow packaging of application code, dependencies, and configurations into an object that can be deployed to the edge location 104. Container software is typically isolated so that each deployed container will behave the same from server to server (e.g., container image includes an application, libraries, binaries, configuration files, etc.).

The power consumption parameter corresponds to an actual or estimated amount of power savings that may be achieved by moving all or a portion of application processing operations from the cloud network 102 to one or more edge locations 104 accounting for edge resource power consumption as compared to cloud resource power consumption when performing processing or other operations. For example, an estimated amount of power consumption can be calculated for server processing operations at an edge location or the cloud based on the operational or processing load and the type of server computer being used taking into account the number of server racks, number of servers per rack, power supply for each server, etc. Machine learning engine 110 can utilize the power consumption parameter in part to drive the edge/cloud resource allocation determination and may include using a power consumption threshold as part of determining whether to allocate processing operations to one or more edge locations 104, cloud network 102, or some combination thereof.

The urgency of request parameter and/or timing of request parameter corresponds to prioritization and/or timing of requests for processing operations from the client devices 106. Machine learning engine 110 can utilize the urgency of request parameter and/or timing of request parameter in part to drive the edge/cloud resource allocation determination and may include using urgency/timing threshold as part of determining whether to allocate processing operations to one or more edge locations 104, cloud network 102, or some combination thereof. Edge manager 108 and/or cloud manager 112 can include one or more business rules that operate in part to override the output of the machine learning engine 110 to force urgency of a request and/or timing of a request to a different edge or cloud resource than what was recommended by the machine learning engine 110 (e.g., is the timing of a request during peak usage times or off-peak hours).

The security parameter corresponds to a type and/or amount of security required or recommended for processing operations by edge and/or cloud resources. For example, the type of security may include strong, medium, or weak encryption and the amount of security may include encrypted processing for all or a portion of application modules and/or encryption of processing results. Machine learning engine 110 can utilize the security parameter in part to drive the edge/cloud resource allocation determination and may include using a security threshold as part of determining whether to allocate processing operations to one or more edge locations 104, cloud network 102, or some combination thereof. Edge manager 108 and/or cloud manager 112 can include one or more business rules that operate in part to override the output of the machine learning engine 110 to force certain application processing operations to be performed using an edge or a cloud resource. For example, an edge location may have hardware resources that are owned and operated by a particular service provider and thereby more control can be exerted over the edge resources to provide secure processing and storage.

The machine learning engine 110 can include logic to assess impact of one or more of the edge/cloud allocation determination parameters on the other parameters. For example, in a hybrid edge/cloud processing mode where some modules are being processed using edge resources and other modules are being processed using cloud resources, the machine learning engine 110 can determine the impact of a high priority or urgent request interleaved with other serial requests to identify an impact on application usage and latency for example. In some cases, business rules can drive critical or urgent processing requests (e.g., critical modules that: affect application responsiveness and/or user interactivity, set alarms, generate notifications (e.g., notifying a gamer, next of kin, doctor, 911, etc.)) to one or more edge locations for processing assuming less delay and more bandwidth available via the edge resources. While a certain number and types of determination parameters are discussed above, other parameters may be taken into account such as a type of operating system, CPU availability and limit, memory availability and limit, storage space availability and limit, network bandwidth availability (e.g., upload capacity, download capacity), network performance, location or point-to-point distance information between edges and client devices, etc.)

Cloud network 102 and one or more edge location 104 can be coupled together as part of providing application services (e.g., video, telephony, gaming, security, IoT, etc.) to a plurality of subscribers over one or a combination of networks such as via a hybrid fiber coax (HFC) and/or optical communication infrastructure that may include optical filters, RF filters, amplifiers, splitters, coaxial, fiber, etc. Cloud network 102 and one or more edge locations 104 can communicate according to a standardized communication protocol that may define upstream and downstream channels to enable bidirectional communications between a service provider and a plurality of subscribers. The HFC or optical network infrastructure can connect to a local subscriber communication network (e.g., a Local Area Network (LAN), a Wireless Local Area Network (WLAN), a Personal Area Network, or other type of network) which may be utilizing servers, workstations, set top boxes, desktop computers, laptop computers, tablets, mobile phones, smart devices, gaming devices, IoT devices, cameras, databases, etc. Further details of the computing devices and variations thereof can be found in FIGS. 7 and 8.

Figure 2:
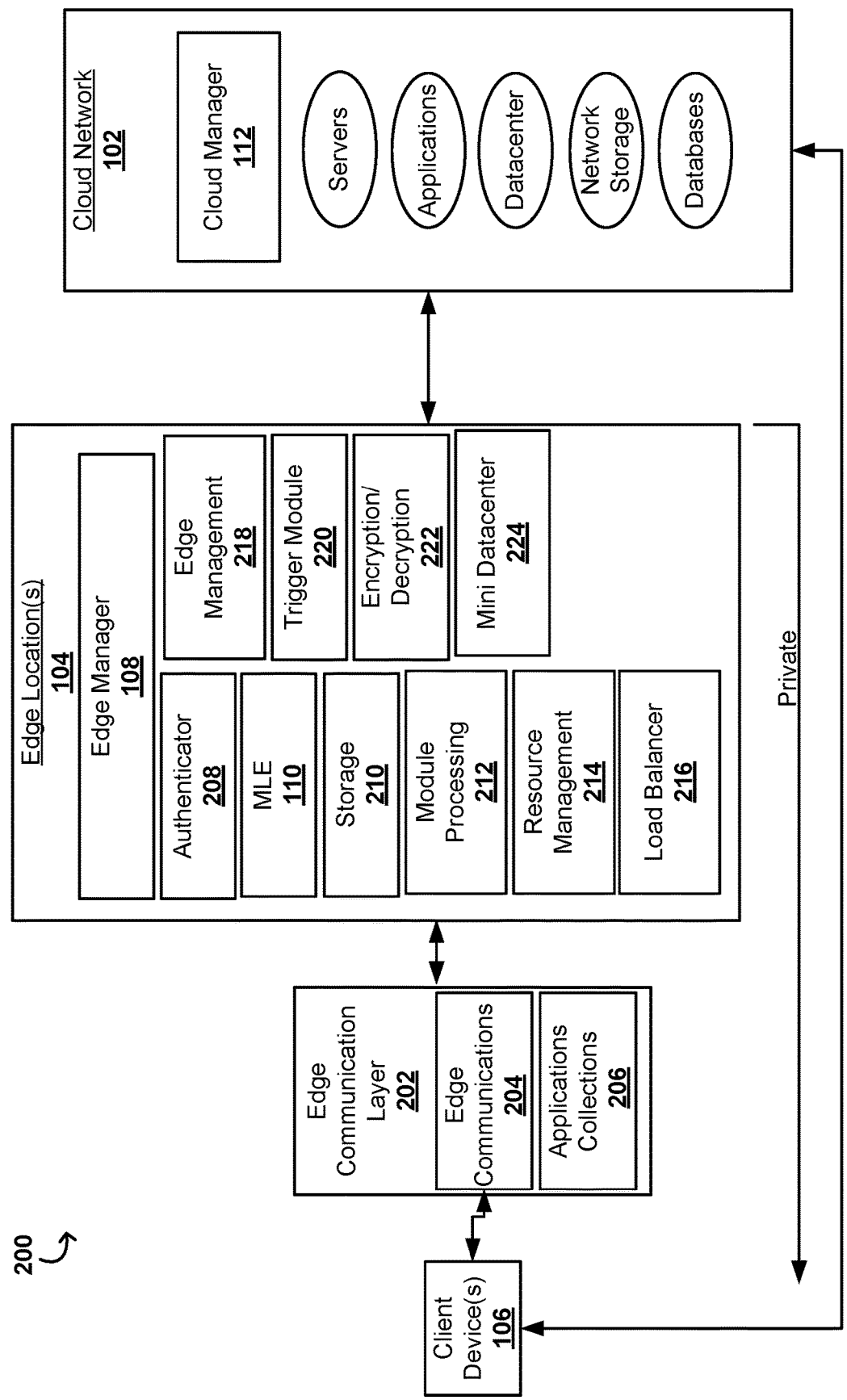
FIG. 2 is a block diagram depicting components of an example system according to an embodiment.

FIG. 2 is a block diagram of a system 200 that includes the communication infrastructure enabling communication between client devices 106 with edge location 104/edge manager 108 and/or cloud network 102/cloud manager 112. For example, client devices 106 can communicate with edge location 104 and/or cloud network 102 via a hybrid-fiber or optical communication network and a local network of a residential or a business location. As an implementation example, edge location 104 can be positioned at a network node, headend location, or positioned in between in a defined proximity from the client devices 106, where the HFC or optical network extends from the headend to a plurality of network nodes that serve a plurality of subscribers. For example, headend location may house a Master Telecommunication Center (MTC) that includes satellite, fiber, transmission servers, cable modem termination system (CMTS), quadrature amplitude modulation (QAM), etc. broadcast, VOD equipment, video and data equipment, modulator/demodulator, etc. As another example, a network node, or other location between the network node and headend location, can be provisioned with edge processing resources (e.g., servers having the resources of edge 104 of FIG. 2). A network node typically includes an equipment cabinet for an Optical Distribution Network (ODN) including switches, multiplexer, demultiplexer, optical line terminals (OLTs), etc.

The headend equipment may be used to encode, modulate, and upconvert one or more of the services onto radio frequency (RF) carriers, combine the RF carriers into a single electrical signal, and provide the electrical signal to a broadband optical transmitter. A broadband optical transmitter may convert the electrical signal to a downstream optically modulated signal that is sent to one or more network nodes over one or more fiber optic cable lines or other conveying infrastructure. Edge equipment includes physical and/or virtual servers having resource management, processing, and storage capabilities, described further below. Client devices 106 can include gateways, routers, modems, set-top boxes STB(s), desktop computers, laptop computers, mobile phones, tablets, gaming devices, television(s), IoT devices, cameras, alarms, etc.

With continuing reference to FIG. 2, system 200 includes edge communication layer 202 that includes an edge communication manager 204 and an applications collections 206 identifying or including entire applications or certain application modules to be processed by the resources of edge location 104. The applications collections 206 identifies the types of applications a subscriber is accessing that could be moved to one or more edge locations. For example, if a subscriber is an online gamer, all or some portion of module processing may be moved to edge location 104 depending in part on the output of machine learning engine 110.

As another example, a subscriber may utilize multiple IoT devices and the power consumption monitoring and/or data collection for the IoT devices in use may be moved to edge location 104 depending in part on the output of machine learning engine 110. A typical IoT device contains one or more sensors, a microprocessor, and a radio chip that can send and receive signals at some operating voltage (e.g., +3.0 to +3.5 V dc). An IoT device's power consumption may be greatest when using the wireless communication radio circuitry as part of transferring sensor data to a receiver, such as an edge location 104, router, cell phone, cloud network 102, or some other receiving device. In some instances, system 200 can monitor and identify traffic through a router, modem, or other component to determine which applications may be added (or removed) for processing at the edge location 104.

Edge communication manager 204 manages communications between client devices 106 and the edge location 104. Edge communication manager 204 operates as a conduit for communications between the client devices 106 and edge location 104 including passing of application processing requests from the client devices 106 to the edge location 104 and application processing responses from the edge location 104 to the client devices 106. Application modules can be described as the constructs of an application program that provide particular features or functionality. A program block may include a plurality of modules.

Edge location 104 of an embodiment includes a number of components including authenticator 208, machine learning engine 110, temporary storage 210, module processing 212, resource management 214, load balancer 216, edge management 218, triggering module 220, encryption/decryption 222, and local mini data center 224 (all or a portion of the edge location 104 components may be incorporated into the edge manager 108).

Authenticator 208 includes executable code or processes that operate in part to authenticate client devices 106 before using edge resources for processing applications. Authenticator 208 ensures that a client device 106 is registered with the edge service as part of an authentication process. For example, authenticator 208 can query a subscriber database to determine if a particular client device 106 has registered with the edge service. An account holder can be registered with one or more edge locations 104 based in part on the distance from each edge location, number and/or types of devices associated with a request, number and/or types of applications associated with a request, current application processing requirements, and/or application processing history. For example, system 200 can operate to register a group of accounts based on proximity to one or more edge locations 104 and allocate edge resources based on the usage and/or priority or some other factor. Business rules can identify certain types of applications for which subscribers are automatically registered at one or more edge locations 104 (e.g., an online gaming application subscriber can be automatically registered with one or more edge locations 104).

Machine learning engine 110 is described above and operates in part to determine whether an edge location 104 should be used solely when performing application processing operations, as part of a hybrid edge/cloud processing process, or when the cloud network 102 is to be used solely when performing application processing operations. Temporary storage 210 includes random access memory or cache that can be used to store output of the machine learning engine 110 as well as application processing output generated at edge location 104. Edge location 104 also include long term storage and processing resources to perform processing operations and store results and other data in long term storage.

Module processing 212 utilizes edge resources for processing of certain modules of an application or blocks at the edge location 104 as determined in part from the output of the machine learning engine 110. Module processing 212 can process modules that have been identified for processing at the edge location 104. In some cases, an entire application may be pushed to the edge location 104 for processing or, in other cases, specific modules or blocks of an application may be pushed to the edge location 104 for processing. For example, in a smart grid application, output of machine learning engine 110 may determine that the edge location 104 will be more efficient and less latent when performing calculations as compared to processing operations performed in the cloud network 102.

Resource management 214 includes executable code or processes to identify available resources or the capacity of one or more edge locations, including edges located within a defined radius or distance, that may be used to perform edge processing operations. In an embodiment, the cloud network 102 may also include resource management functionality to identify the limits of the cloud from resources perspective in order to complete or reroute application or module processing operations.

Load balancer 216 includes executable code or processes that operate to efficiently distribute application processing and/or other operations/processes across available edge locations 104 (e.g., via one or more servers at one or more edge locations 104). In some cases, system 200 receives concurrent application processing requests from hundreds of clients in order to return application data whether resulting from edge-only processing, hybrid edge-cloud processing, or cloud-only processing. Based in part on output of the machine learning engine 110, load balancer 216 can distribute application processing operations to provide reliable, fast, and efficient processing using edge and/or cloud resources. Load balancer 216 operates in part to rout client requests across all servers capable of serving the requests to maximize speed and capacity utilization while preventing server saturation.

Edge management 218 includes executable code or processes to federate edge resources and surrounding edges resources based on the capabilities and the limits of each edge location 104. For example, in a smart grid implementation example, if a first edge location is completely at peak, then edge management 218 attempts to identify other edge locations that might have sufficient capabilities to transfer a workload of application processing operations before requesting assistance from cloud network 102. The edge management 218 also manages communication between one or more edge locations and the cloud network 102.

Triggering module 220 includes executable code or processes that, once edge processing is warranted, route processing operations for a client device 106 to one or more edge locations 104 accounting for the distance between the edge location 104 and the client device 106, types of applications available at edge location 104, and/or output from the machine learning engine 110 and/or business rules. Additional logic may be added to a router, modem, or other network device to assist in guiding traffic to one or more edge locations 104. If an edge location 104 malfunctions or its performance drops below a performance threshold, triggering module 220, working in conjunction with edge management 218, can direct traffic to a different edge location 104 or back to the cloud network 102.

Encryption/decryption 222 includes executable code or processes that operate to encrypt and decrypt data at the edge location 104. For example, encryption/decryption 222 can use an encryption operation to encrypt application data generated at edge location 104 or decrypt data received from client devices 106 or cloud network 102. Various types of encryption/decryption can be implemented (e.g. low, medium, high) according to the types of applications and/or network types (e.g., public vs. private).

With continuing reference to FIG. 2, cloud network 102 of an embodiment includes a cloud manager 112 that includes executable code or processes that operate to manage the physical and virtual servers of the cloud network 102. For example, cloud manager 112 can be used to manage datacenter resource allocation of a service provider at various locations around the globe. Cloud network 102 can also include one or more machine learning engines that generate output representative of a load on resources of the cloud network 102. Cloud manager 112 of an embodiment operates to adjust module processing based on a machine learning decision, turn on and off module processing resources of the cloud network 102, communicate with different edge locations based on an edge request, provide interaction between the cloud network 102 and one or more edge locations 104, provide encryption/decryption services, and store processed data in long term storage resulting from edge and/or cloud application processing and other operations.

As an example of the interaction between the cloud network 102 and one or more edge locations 104, as described above, output from a machine learning engine 110 can be used to drive a determination of whether to push application and/or individual module processing to one or more edge locations 104. Based on the output from the machine learning engine 110, an edge processing request can be transmitted from one or more edge locations 104 by edge manager 108 to move a module or processing block to the storage 210 of one or more edge locations 104 for processing with the edge resources. For example, in a smart grid implementation, based on the machine learning output, the cloud manager 112 can recommend moving all IoT device processing to edge locations to reduce latency and free bandwidth for cloud processing operations.

The edge manager 108 of an edge location 104 can send a request to the cloud manager 112 to move processing operations to an identified edge location 104 which can be acknowledged by the cloud manager 112. Once acknowledged (e.g., an acknowledgment message transmitted from the cloud manager 112), the cloud network 102 can cease application processing applications for the entire application or just certain modules or containers and the identified edge location 104 uses the edge resources to perform the application processing operations for the client device 106.

If the performance of the edge resources at edge location 104 degrades below some performance threshold or becomes non-responsive, the edge manager 108 can transmit a message to the cloud manager 112 or another edge location 104 requesting assistance in resume processing applications for the client device 106 along with information associated with a most recent processed application module. For example, the edge manager 108 can transmit which application is being processed along with an identification of a module or code portion most recently processed to completion (along with the processing results).

The cloud manager 112 and edge manager 108 and the associated machine learning engines cooperatively communicate to adaptively and efficiently allocate resources to and from edge locations 104 and/or the cloud network 102. Outputs of cloud-based and edge-based machine learning engines are used to drive which application and/or application modules to process using edge and/or cloud resources. For example, outputs of the machine learning engines used in conjunction with business rules can be used to collectively decide on whether to implement edge-only resources, cloud-only resources, or a hybrid edge-cloud resource allocation accounting for the various learning parameters described above. Hybrid edge-cloud processing enables use of both platforms to efficiently process certain application modules. For example, cloud-based resources may be used for pre-processing and post-processing operations whereas edge-based resources may be used for application modules that require the least amount of latency.

Figure 3:
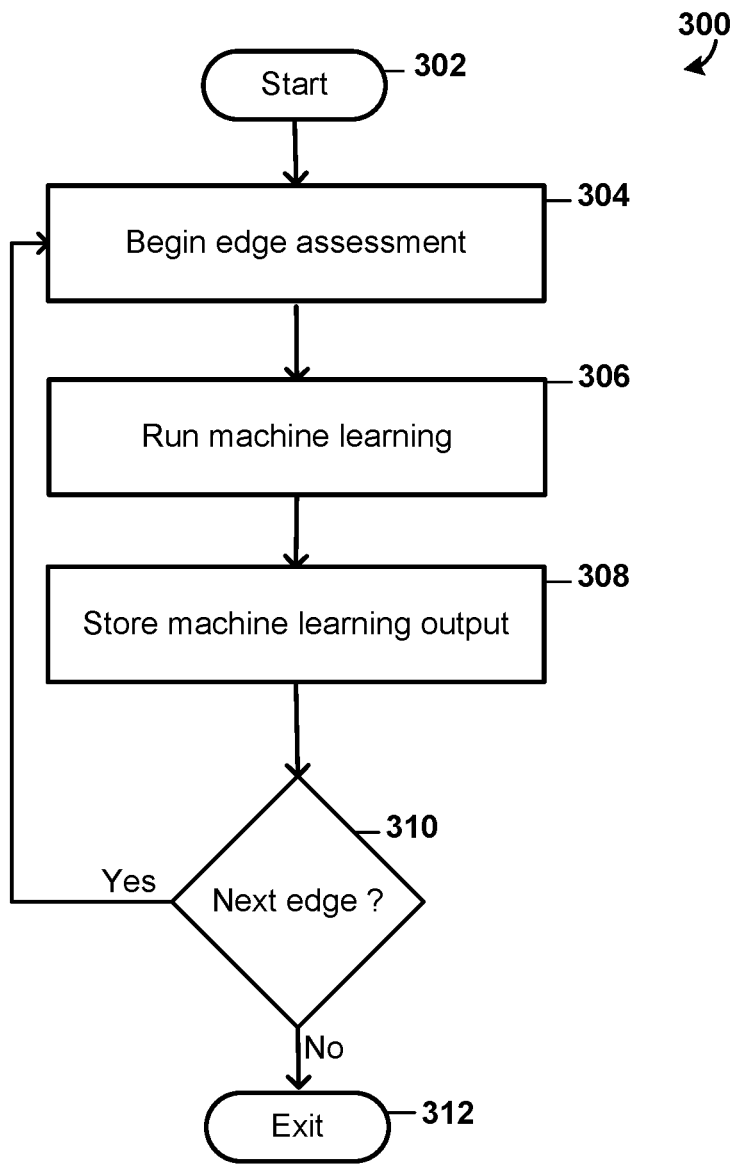
FIG. 3 depicts a process of using cloud-based and/or edge-based machine learning engines to generate outputs that are used to drive application processing operations according to an embodiment.

FIG. 3 depicts a process 300 of using cloud-based and/or edge-based machine learning engines to generate outputs that are used to drive application processing operations using edge-only resources, cloud-only resources, or hybrid edge-cloud resources. Process 300 starts at 302 and proceeds to 304 which initiates the edge resource and cloud resource assessment. For example, edge locations 104 within a certain distance from registered client devices may be triggered to begin the resource allocation assessment on a periodic basis (e.g., hourly, daily, weekly, etc.).

At 306, process 300 uses the cloud-based and/or edge-based machine learning engines to execute machine learning algorithms (e.g., Logistic Regression (LR), Naive-Bayes, Random Forest (RF), neural networks (NN), matrix factorization, Support Vector Machines (SVM), decision tree, etc.) to determine whether to utilize edge-only resources, cloud-only resources, or hybrid edge-cloud resources to perform application processing operations. For example, physical and virtual servers (i.e. resources) may be used to run the machine learning algorithms to generate the resource allocation output.

Process 300 of an embodiment uses a plurality of resource allocation parameters as inputs to generate the machine learning output including, but not limited to, a type of application parameter, a usage parameter, a time latency parameter, a power consumption parameter, an urgency of request parameter and/or timing of request parameter, an estimated cloud travel time parameter and/or processing cloud time parameter, and/or a security parameter. At 308, the output is stored in local and/or remote storage devices. For example, cloud-based machine learning output can be stored in the cloud network 102 and edge-based machine learning can be stored at an edge location 104. The machine learning output (e.g., edge resource allocation assessment data, parameters used, time of machine learning engine processing, etc.) may be shared between edges and between edges and the cloud. If there are no further edge locations to run the machine learning engine at 310, process 300 exits at 312. If there are additional edges to run the machine learning engine at 310, process returns to 304.

Figure 4:
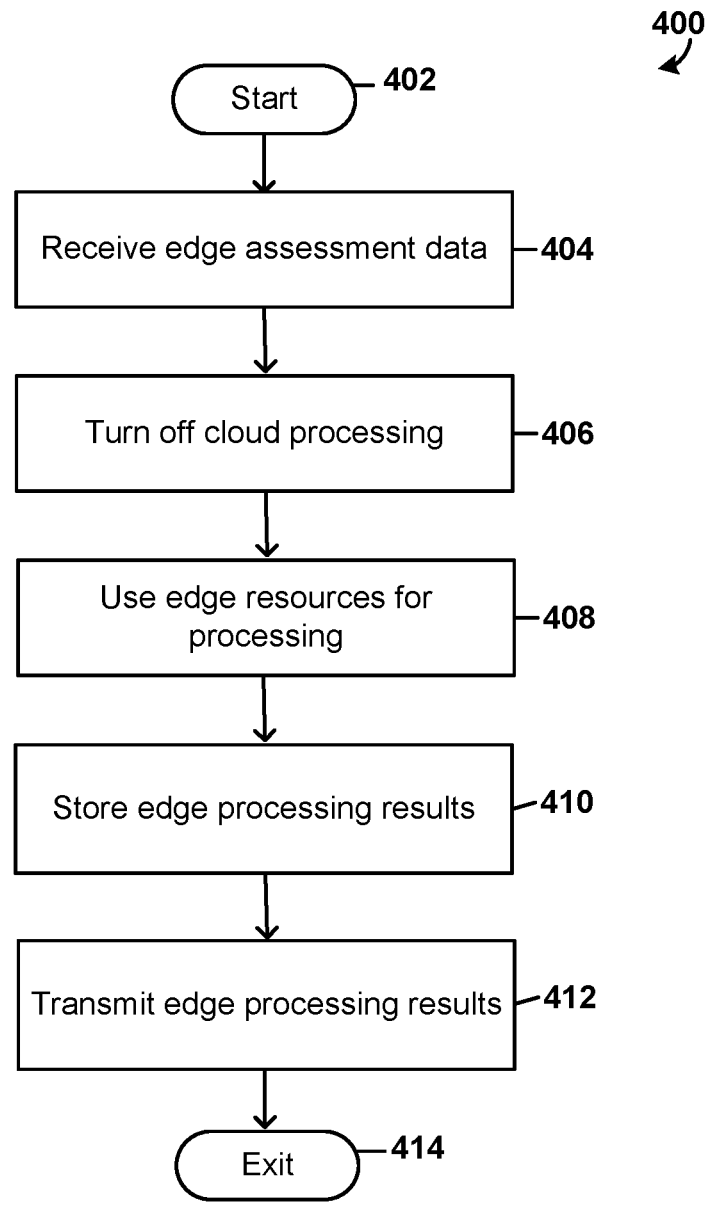
FIG. 4 depicts a process of using the output from a machine learning engine to direct processing of one or more applications or application modules to one or more edge locations according to an embodiment.

FIG. 4 depicts a process 400 of using the output from a machine learning engine to direct processing of one or more applications or application modules to one or more edge locations 104. Process 400 starts at 402 and proceeds to 404 where the output of the machine learning engine provides edge assessment data that directs the cloud manager 112, or edge manager 108 from the same or another location, to move or copy, unless already located at a targeted edge location, one or more applications and/or application modules or containers to an edge server at the targeted location. In some instances, the edge manager 108 at the targeted location can request or copy the applications or application modules from another trusted network location. For example, the edge server at the first location may be located at a network node or headend which serves client devices of a plurality of subscribers who are using the same type of application and the output of the machine learning algorithm recommends edge processing according to values associated with the latency parameter and the security parameter, which are weighted more heavily for the application type.

At 406, process 400 uses cloud manager 112 to disable or turn off cloud processing for the one or more applications or application modules to be processed using edge resources. For example, once the edge manager 108 acknowledges (e.g., a triggering event) that a targeted edge location is ready for processing, cloud manager 112 can set a processing flag to false so that cloud resources are not used to process the associated application or application module(s). At 408, process 400 uses an edge server at identified edge location 104 to process one or more applications or application modules. At 410, process 400 stores results from the processing operations in storage (e.g., temporary storage 210) at the edge location 104. At 412, process 400 transmits the processing results to client device 106 and/or cloud network 102 before exiting at 414. In some cases, processing results can be transmitted first to the client device 106 before storing the results at the edge location to improve response times.

Figure 5:
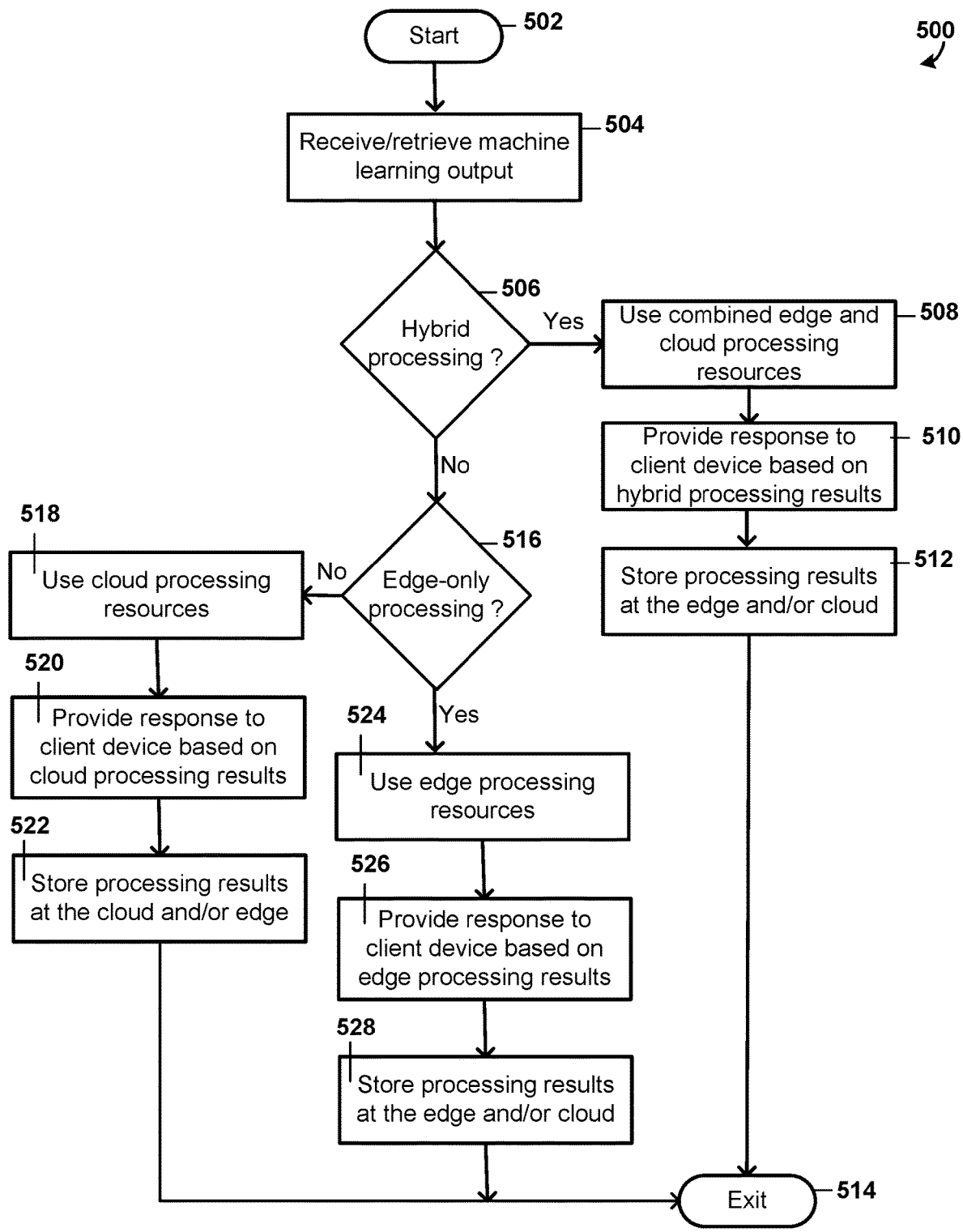
FIG. 5 depicts a process of using output from a machine learning engine to determine how to allocate processing resources in response to requests from client devices according to an embodiment.

FIG. 5 depicts a process 500 of using output from a machine learning engine to adaptively allocate processing resources in response to requests from client devices. Process 500 begins at 502, then proceeds to 504 where machine learning output is received or retrieved from one or more edge locations 104 or the cloud network 102. For example, edge manager 108 can transmit machine learning output representative of edge resource allocation determinations to the cloud manager 112 as part of identifying which edge location or locations 104 will be used to process a client request for registered client devices or subscribers.

If the edge resource allocation determination results in the cloud manager 112 (or edge manager 108) initiating a hybrid edge/cloud processing mode at 506, process 500 proceeds to 508 and uses the combined resources of cloud network 102 and edge location(s) 104 to process the client request. For example, based on the output of the machine learning engine 110, cloud manager 112 can assign certain application modules or containers to be processed at one or more edge locations 104 while the remaining application modules or containers are to be processed at cloud network 102. Synchronization of processing results are coordinated by the edge manager and the cloud manager 112. At 510, process 500, provides a response to the client request according to the hybrid processing operations. At 512, process 500 stores the processing results in one or more of the edge locations 104 and/or cloud network 102 and, depending on a last module processed, the cloud manager 112 or edge manager 108 waits for a next request from the client device 106 and, if no additional client requests are received or pending, exits at 514.

If the edge resource allocation determination does not result in initiating the hybrid edge/cloud processing mode at 506 or initiating an edge-only processing mode at 516, process 500 proceeds to 518 and uses the cloud resources of cloud network 102 to process the client request. At 520, process 500 uses the cloud manager 112 to respond to the request from client device 106 based on the cloud-only processing operations. At 522, process 500 stores the processing results in the cloud network 102 (which may be shared with edge locations). If no additional client requests are received or pending, process 500 exits at 514.

If the edge resource allocation determination does not result in initiating a cloud-only processing mode at 516, process 500 proceeds to 524 and uses the edge resources of one or more edge locations 104 to process the client request. At 526, process 500 uses the edge manager 108 to respond to the request from client device 106 based on the edge-only processing operations. At 528, process 500 stores the processing results at the edge location 104 and the edge manager 108 transmits the results to the cloud network 102 for storing and, if no additional client requests are received or pending, process 500 exits at 514. Results from the various processing modes can be fed back into the machine learning engines 110 to further refine the corresponding algorithms.

In an embodiment, process 500 can use the edge manager 108 to monitor performance of an edge server being used for processing operations, and if the performance falls below a performance threshold (e.g., CPU availability and limit, memory availability and limit, storage space availability and limit, network bandwidth availability (e.g., upload capacity, download capacity), network performance, etc.), edge manager 108 can call on a different edge location or the cloud network 102 to continue any incomplete processing operations. Also, once it is determined to use edge-only resources for processing operations, the edge only resources will continue to be used to thereby prevent any latency contribution by cloud resources until a business rule is invoked or machine learning triggers a change in a processing recommendation. While the operations depicted and described in the various flow diagrams follow a particular order it will be appreciated that different orders can be used and some of the operations may be further combined with other operations.

Figure 6:
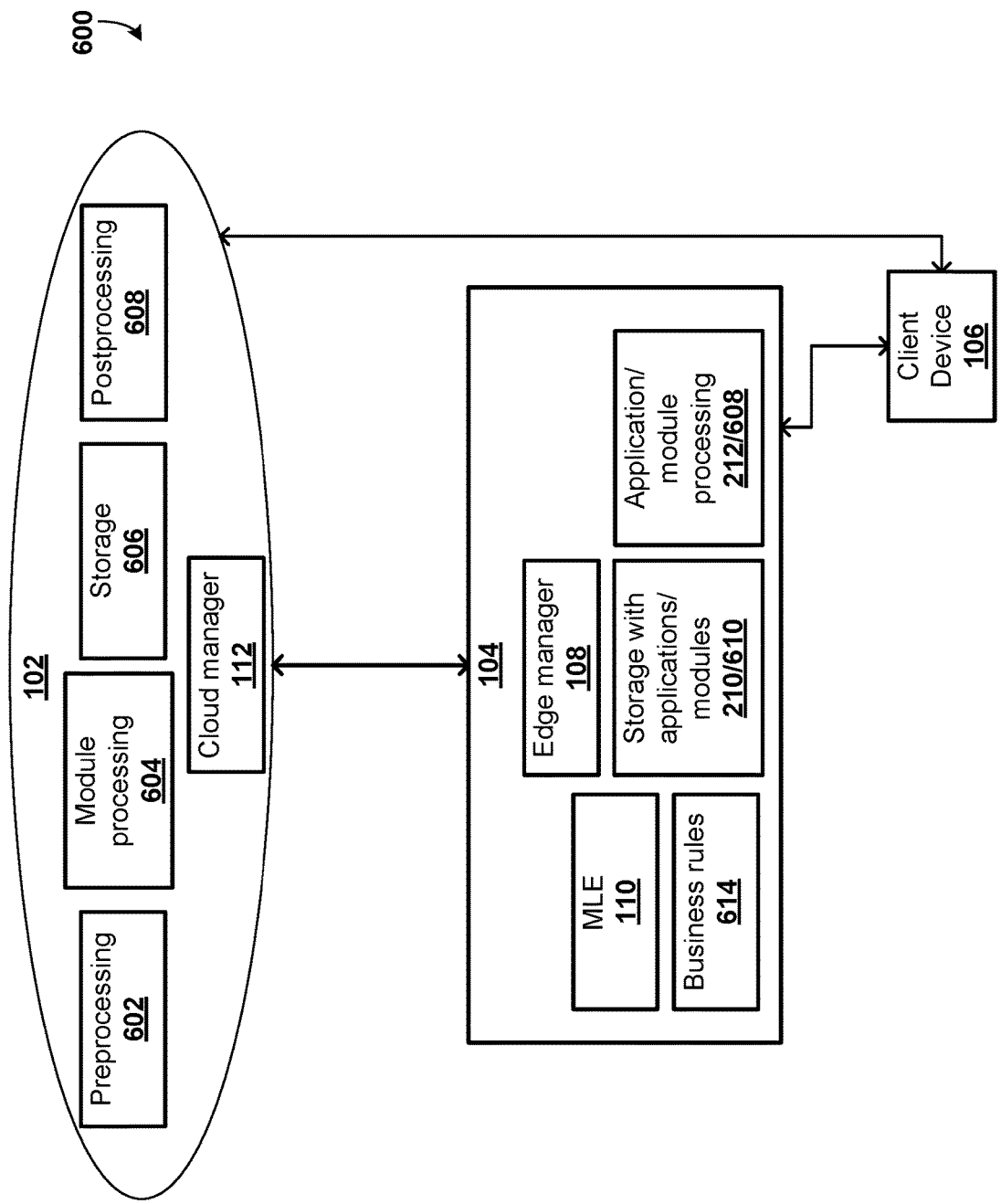
FIG. 6 is a diagram of an exemplary network environment that includes an edge location and a cloud network to allocate application processing operations for client devices using edge and/or cloud resources.

FIG. 6 is a diagram of an exemplary network environment 600 that includes edge location 104 and cloud network 102 to allocate application processing operations for client devices 106 using edge and/or cloud resources. As an implementation example, cloud network 102 includes preprocessing 602 for preparing the data for processing (e.g., sanitizing, decryption, removing protocols, etc.), module processing 604 for an entire application or several application components (e.g., modules or containers), storage 606 for storing preprocessed, processed, and/or post-processed data, and post-processing and/or packaging 608 (e.g., encryption, adding protocols, etc.).

Edge location 104 includes machine learning engine 110, which may be shared with cloud network 102, storage 610 for storing application or modules that have been moved or copied to edge location 104, and application processing output 612 for applications or application modules running on the edge. As described above, machine learning engine 110 can execute the machine learning algorithm to provide recommendations or commands for which application modules or containers should be processed at one or more edge locations 104. Historical data can be used in order to train the machine learning engine 110 while cloud-only resources are used initially for application processing while building up the historical data and refining the machine learning engine 110.

As shown in FIG. 6, business rules 614 can be applied to the output of the machine learning engine 110 to refine a decision as to whether to implement the cloud-only processing mode, hybrid edge-cloud processing mode, or edge-only processing mode. The business rules 614 can include any cloud or edge override operations as well as thresholds to apply when determining where to place processing operations. For an edge-only processing mode, functionalities of components 602, 604, and 608 can be applied at the edge location 104. In some cases, cloud network 102 and the edge location 104 can include the same applications and associated application modules so that there is no delay from having to push or copy an application or application module from the cloud network 102 (or another edge) to the edge location 104.

As an example of the adaptive processing functionality described herein, assume that five online game users initiate playing of an online game by each launching a gaming application using respective client devices including providing authentication information (e.g., username/password, thumbprint, retina scan, etc.) to the cloud network 102. Initially, if edge-only processing has not previously been invoked for any of the gamers, cloud network 102 is used to facilitate the start or resumption of the online game play. If machine learning output or a business rule forces use of edge-only resources, edge manager 108 or cloud manager 112 assigns two of the game users to a first edge location, assigns two other users to a second edge location, and assigns one user to a third edge location. As part of the edge-only processing, cloud manager 112 turns off all or part of the online game application processing at the cloud network 102 for the authenticated users/devices. At each edge, all or parts of the online game can be placed on each edge location in order to provide the best performance and experience when playing the online game.

Figure 7:
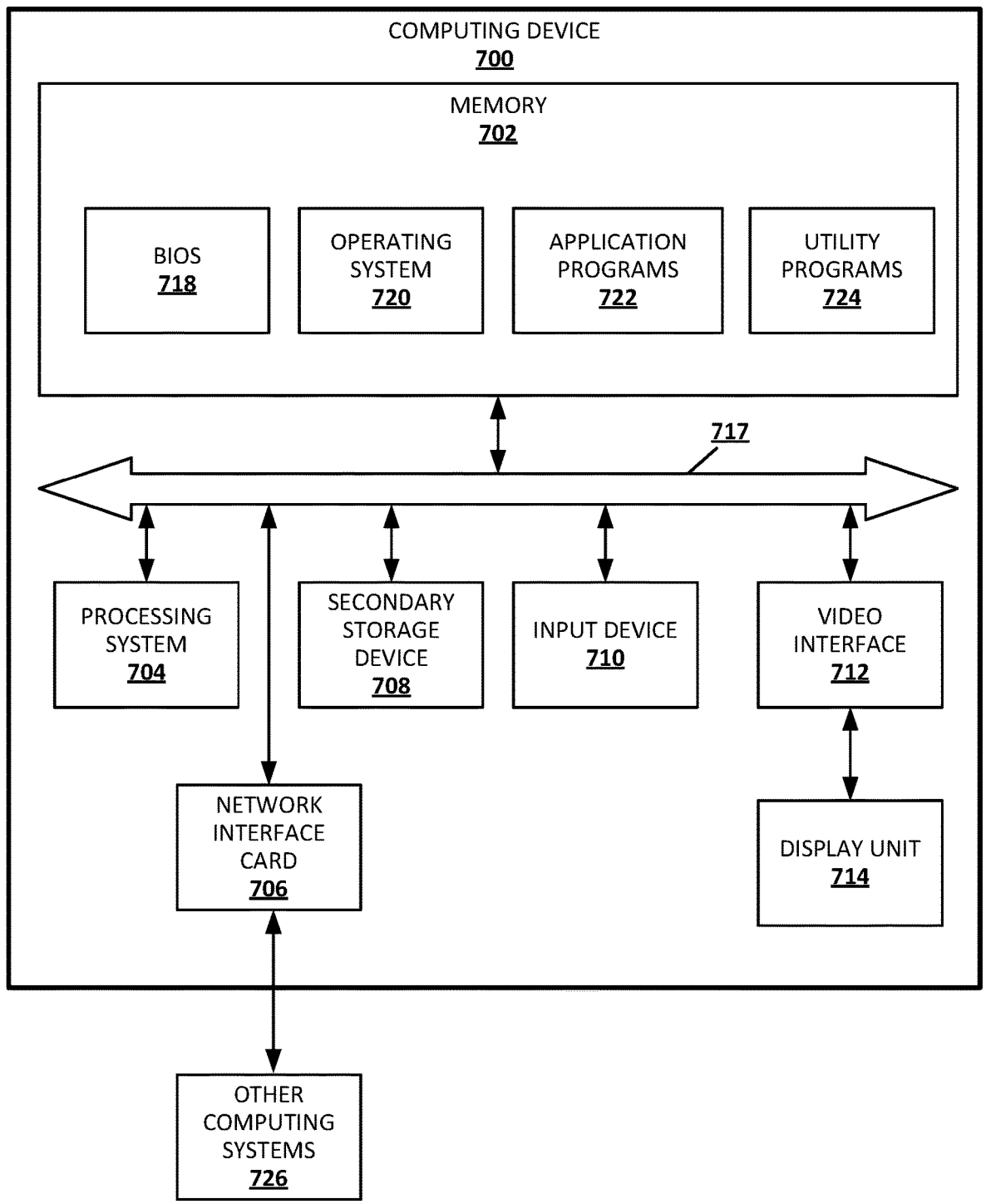
FIG. 7 is a block diagram illustrating example physical components of a computing device or system with which embodiments may be practiced.

FIG. 7 is a block diagram illustrating example physical components of a computing device 700 or system with which embodiments may be practiced. It should be appreciated that in other embodiments, different hardware components other than those illustrated in the example of FIG. 7 may be used. Computing devices may be implemented in different ways in different embodiments. For instance, the computing device 700 includes a processing system 704, memory 702, a network interface card 706 (wired and/or wireless), a secondary storage device 708, an input device 710, a video interface 712, a display unit 714, and a communication medium 717. In other embodiments, the computing device 700 may be implemented using more or fewer hardware components (e.g., a video interface, a display unit, or an input device) or in combination with other types of computer systems 726 and program modules.

The memory 702 includes one or more computer-readable storage media capable of storing data and/or computer-executable instructions. Memory 702 may store the computer-executable instructions that, when executed by a processor or processing unit of the processing system 704, cause operations, such as the operations described above with respect to FIGS. 3-6). In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units (e.g., one or more processors), which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., WIFI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 717 facilitates communication among the hardware components of the computing device 700. In different embodiments, the communications medium 717 facilitates communication among different components of the computing device 700. For instance, in the example of FIG. 7, the communications medium 717 facilitates communication among the memory 702, the processing system 704, the network interface card 706, the secondary storage device 708, the input device 710, and the video interface 712. In different embodiments, the communications medium 717 is implemented in different ways, such as a PCI bus, a PCI Express bus, an accelerated graphics port (AGP) bus, an InfiniBand® interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs or program code 722 that, when executed by the processing system 704, cause the computing device 700 to provide applications to users. The memory 702 also stores one or more utility programs 724 that, when executed by the processing system 704, cause the computing device 700 to provide utilities to other software programs.

Embodiments may be used in combination with any number of computer systems, such as in server environments, desktop environments, laptop or notebook computer systems, multiprocessor systems, micro-processor based or programmable consumer electronics, networked PCs, mini computers, main frame computers and the like. Embodiments may be utilized in various distributed computing environments where tasks are performed by remote processing devices that are linked through a communications network in a distributed computing environment, and where program code may be located in local and/or remote memory storage (e.g., memory and/or disk(s)).

All system components described herein may be communicatively coupled via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPoE), etc. including any combination thereof.

Figure 8:
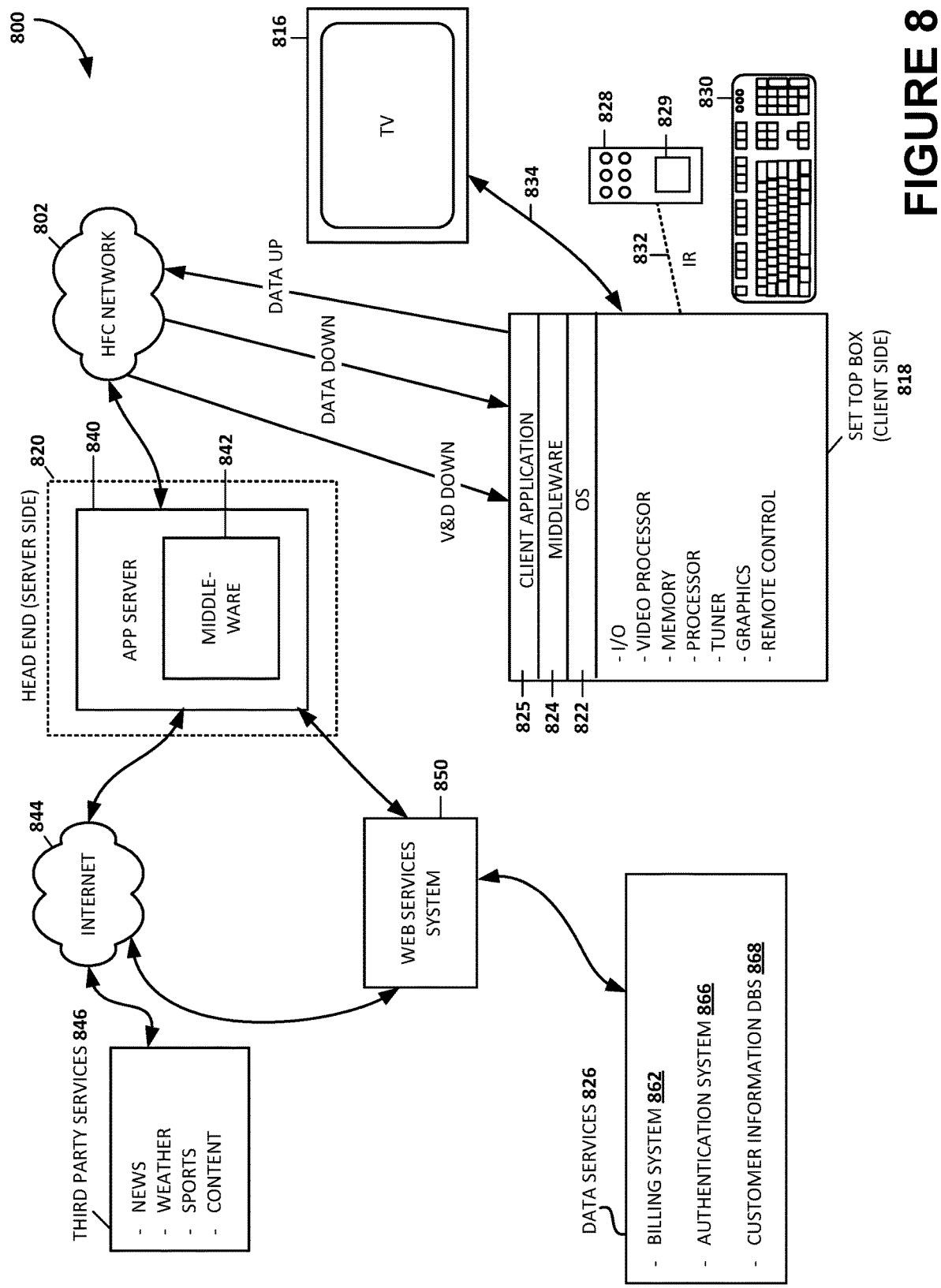
FIG. 8 is a block diagram illustrating components of a cable services system architecture providing an example operating environment according to aspects of the present disclosure.

FIG. 8 is a block diagram illustrating a cable television services system 800 (hereafter referred to as "CATV") architecture providing an operating environment according to an aspect. As should be appreciated, a CATV services system 800 is but one of various types of systems that can be utilized for providing an operating environment described herein. System 800 provides digital and analog video programming, information content and interactive television services via a HFC or optical network 802 to a television set 816 for consumption by a cable television/services system customer. Typically, fiber optic cable lines run from the cable head end 820 to network nodes that serve subscribers. Coaxial cable and/or fiber lines run from the optical fiber feeders to each subscriber.

The CATV system 800 is in the form of a distributed client-server computing system for providing video and data flow across the HFC network 802 between server-side services providers (e.g., cable television/services providers), such as video content feed provider, via a server-side head end 820 and a client-side customer via a STB 818 functionally connected to a customer receiving device, such as the television set 816. The functionality of the HFC network 802 allows for efficient bidirectional data flow between the STB 818 and an application server 840 of the server-side head end 820. As is understood by those skilled in the art, modern CATV systems can provide a variety of services across the HFC network 802 including traditional digital and analog video programming, telephone services, high speed Internet access, video-on-demand, and services.

On the client side of the CATV system 800, digital and analog video programming and digital and analog data are provided to the customer television set 816 via the STB 818. Interactive television services that allow a customer to input data to the CATV system 800 likewise are provided by the STB 818. As illustrated in FIG. 8, the STB 818 is a multipurpose computing device having a computer processor, memory, and an input/output mechanism. The input/output mechanism receives input from server-side processes via the HFC network 802 and from customers via input devices such as a remote control device 828, keyboard 830, or other computing device, such as a tablet/slate computer, smart phone, etc. The remote control device 828 and the keyboard 830 can communicate with the STB 818 via a suitable communication transport such as the infrared connection 832. The remote control device 828 can include a biometric input module 829. The STB 818 also includes a video processor for processing and providing digital and analog video signaling to the television set 816 via a cable communication transport 834. A multi-channel tuner is provided for processing video and data to and from the STB 818 and the server-side head end 820, described below.

The STB 818 also includes an operating system 822 for directing the functions of the STB 818 in conjunction with a variety of client applications 825. For example, if a client application 825 requires a news flash from a third-party news source to be displayed on the television 816, the operating system 822 can cause the graphics functionality and video processor of the STB 818, for example, to output the news flash to the television 816 at the direction of the client application 825 responsible for displaying news items.

Because a variety of different operating systems 822 can be utilized by a variety of different brands and types of set-top boxes 818, a middleware layer 824 can be provided to allow a given software application to be executed by a variety of different operating systems. According to an embodiment, the middleware layer 824 can include a set of application programming interfaces (APIs) that are exposed to client applications and operating systems 822 that allow client applications 825 to communicate with the operating systems 822 through common data calls understood via the API set. As described below, a corresponding middleware layer 842 is included on the server side of the CATV system 800 for facilitating communication between the server-side application server and the client-side STB 818. The middleware layer 842 of the server-side application server and the middleware layer 824 of the client-side STB 818 can format data passed between the client side and server side according to the Extensible Markup Language (XML).

According to one aspect, the STB 818 passes digital and analog video and data signaling to the television 816 via a one-way communication transport 834. According to other aspects, two-way communication transports can be utilized, for example, via high definition multimedia (HDMI) ports. The STB 818 can receive video and data from the server side of the CATV system 800 via the HFC network 802 through a video/data downlink and data via a data downlink. The STB 818 can transmit data from the client side of the CATV system 800 to the server side of the CATV system 800 via the HFC network 802 via one data uplink. The video/data downlink is an "in band" downlink that allows for digital and analog video and data signaling from the server side of the CATV system 800 through the HFC network 802 to the STB 818 for use by the STB 818 and for distribution to the television set 816. As is understood by those skilled in the art, the "in band" signaling space operates at a relative high frequency, e.g., between 54 and 1000 megahertz. The signaling space is generally divided into 6 megahertz channels in which can be transmitted as a single analog signal or a greater number (e.g., ten) of digital signals.

The data downlink and the data uplink, illustrated in FIG. 8, between the HFC network 802 and the STB 818 comprise "out of band" data links. As is understand by those skilled in the art, the "out of band" frequency range is generally at a lower frequency than "in band" signaling. For example, the "out of band" frequency range can be between zero and 54 megahertz. Data flow between the STB 818 and the server-side application server 840 is typically passed through the "out of band" data links. Alternatively, an "in band" data carousel can be positioned in an "in band" channel into which a data feed can be processed from the application server 840 through the HFC network 802 to the STB 818. Operation of data transport between components of the CATV system 800, described with reference to FIG. 8, is well known to those skilled in the art.

Referring still to FIG. 8, the head end 820 of the CATV system 800 is positioned on the server side of the CATV system and includes hardware and software systems responsible for originating and managing content for distributing through the HFC network 802 to client-side STBs 818 for presentation to customers. As described above, a number of services can be provided by the CATV system 800, including digital and analog video programming, interactive television services, telephone services, video-on-demand services, targeted advertising, and/or provision of supplemental content.

The application server 840 can be configured as a computing system operative to assemble and manage data sent to and received from the STB 818 via the HFC network 802. As described above, the application server 840 includes a middleware layer 842 for processing and preparing data from the head end 820 of the CATV system 800 for receipt and use by the client-side STB 818. For example, the application server 840 via the middleware layer 842 can obtain supplemental content from third-party services 846 via the Internet 844 for transmitting to a customer through the HFC network 802, the STB 818, and recording by a local or remote DVR. For example, content metadata from a third-party content provider service can be downloaded by the application server 840 via the Internet 844. When the application server 840 receives the downloaded content metadata, the middleware layer 842 can be utilized to format the content metadata for receipt and use by the STB 818. Therefore, content metadata can be sent and categorized based on the availability to the customer's program guide data.

According to one embodiment, data obtained and managed by the middleware layer 842 of the application server 840 is formatted according to the Extensible Markup Language and is passed to the STB 818 through the HFC network 802 where the XML-formatted data can be utilized by a client application 825 in concert with the middleware layer 824, as described above. As should be appreciated by those skilled in the art, a variety of third-party services data 846, including news data, weather data, sports data and other information content can be obtained by the application server 840 via distributed computing environments such as the Internet 844 for provision to customers via the HFC network 802 and the STB 818. Additionally, the application server 840 may receive data via the Internet 844.

According to aspects, the application server 840 obtains customer support services data, including billing data, information on customer work order status, answers to frequently asked questions, services provider contact information, and the like from data services 826 for provision to the customer via an interactive television session. The data services 826 include a number of services operated by the services provider of the CATV system 800 which can include profile and other data associated with a given customer.

A billing system 862 can include information such as a customer's name, street address, business identification number, Social Security number, credit history, and information regarding services and products subscribed to by the customer. According to embodiments, the billing system 862 can also include billing data for services and products subscribed to by the customer for bill processing, billing presentment and payment receipt. An authentication system 866 can include information such as secure user names, subscriber profiles, subscriber IDs, and passwords utilized by customers for access to network services. A customer information database 868 can include general information about customers such as place of employment, business address, business telephone number, and demographic information such as age, gender, educational level, and the like. The customer information database 868 can also include information on pending work orders for services or products ordered by the customer. The customer information database 868 can also include general customer information such as answers to frequently asked customer questions and contact information for various service provider offices/departments. As should be understood, this information can be stored in a variety of disparate databases operated by the cable services provider.

Referring still to FIG. 8, web services system 850 is illustrated between the application server 840 and the data services 826. According to aspects, web services system 850 serves as a collection point for data requested from each of the disparate data services systems comprising the data services 826. According to aspects, when the application server 840 requires customer services data from one or more of the data services 826, the application server 840 passes a data query to the web services system 850. The web services system 850 formulates a data query to each of the available data services systems for obtaining any required data for a requesting customer as identified by a set-top box identification associated with the customer. The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above. As should be understood by those skilled in the art, the disparate systems 850, 862, 866, 868 can be integrated or provided in any combination of separate systems, wherein FIG. 8 shows only one example.

Aspects, for example, are described above with reference to block diagrams and/or operational illustrations of methods, systems, and computer program products according to embodiments. The functions/acts noted in the blocks can occur out of the order as shown in any flowchart or described herein. For example, two processes shown or described in succession can in fact be executed substantially concurrently or the blocks can sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

What is claimed is:

1. A system to adaptively process applications or application modules using edge-only resources, hybrid edge-cloud resources, and/or cloud-only resources comprising:
   an edge-based computing environment including:
      one or more server computers; and
      a machine learning engine to execute on one or more of the server computers to generate output determinations as to which blocks or portions of an application are to be processed by the one or more server computers of an edge-based computing environment, a cloud-based computing environment, or a hybrid edge-cloud computing environment, the machine learning engine including a machine learning algorithm that processes at least two of: a customer subscription type parameter, a customer location parameter, a type of application parameter, a usage parameter, a time latency parameter, a power consumption parameter, an urgency of request parameter and/or a timing of request parameter, an estimated cloud travel time parameter and/or a processing cloud time parameter, and/or a security parameter for the determinations, the system, based on the output of the machine learning engine, to utilize a cloud-only processing mode, a hybrid edge-cloud processing mode, and/or an edge-only processing mode to process the applications or application modules, wherein the determined processing mode can be changed by an edge manager or a cloud manager based on one or more business rules.

2. The system of claim 1, wherein the hybrid edge-cloud processing mode operates to perform a first type of application processing operations using resources of the edge-based computing environment and a second type of application processing operations using resources of the cloud-based computing environment.

3. The system of claim 2, wherein the edge-only processing mode operates to perform application processing operations solely using resources of the edge-based computing environment.

4. The system of claim 3, wherein the cloud-only processing mode operates to perform application processing operations solely using resources of the cloud-based computing environment.

5. The system of claim 1, wherein the edge-based computing environment is located at a network node of a hybrid fiber coaxial or optical network.

6. The system of claim 1, wherein the edge-based computing environment is located at a headend location of a hybrid fiber coaxial or optical network.

7. The system of claim 1, further comprising an edge manager or a cloud manager to identify alternative edge locations to transfer processing if a current edge resource is at a threshold processing capacity.

8. The system of claim 7, further to transfer processing to an alternative edge location before moving processing to the cloud-based computing environment.

9. The system of claim 7, wherein the edge manager operates to register one or more subscribers for an edge processing service before moving processing operations to an edge resource.

10. The system of claim 7, wherein the edge manager operates to receive an edge processing request based on a recommendation output from the machine learning engine to move processing of an application module or block to an edge resource.

11. A method of adaptively processing applications or application modules using edge-only resources, hybrid edge-cloud resources, and/or cloud-only resources comprising:
   registering, by an authenticator, a subscriber for an edge processing service that utilizes edge resources to perform processing operations for an application or an application portion;
   determining, for the registered subscriber, whether to utilize a cloud-only processing mode, a hybrid edge-cloud processing mode, or an edge-only processing mode, wherein the determining is based on at least two of a plurality of factors including: a customer subscription type parameter, a customer location parameter, a type of application parameter, a usage parameter, a time latency parameter, a power consumption parameter, an urgency of request parameter and/or a timing of request parameter, an estimated cloud travel time parameter and/or a processing cloud time parameter, and/or a security parameter; and performing processing operations for the application or the application portion according to one of the cloud-only processing mode, the hybrid edge-cloud processing mode, and the edge-only processing mode, wherein the determined processing mode can be changed by an edge manager or a cloud manager based on one or more business rules.

12. The method of claim 11, wherein the hybrid edge-cloud processing mode operates to perform a first type of application processing operations using edge-computing resources and a second type of application processing operations using cloud-computing resources.

13. The method of claim 11, wherein the edge-only processing mode operates to perform application processing operations solely using resources of an edge-based computing environment.

14. The method of claim 13, wherein the edge-only processing mode operates at a network node or a headend location of a hybrid fiber coaxial or optical network.

15. The method of claim 13, further comprising identifying alternative edge locations to transfer processing if a current edge resource is at a threshold processing capacity.

16. The method of claim 13, further comprising registering one or more subscribers for an edge processing service before moving processing operations to an edge resource.

17. The method of claim 13, further comprising transmitting processing results from the edge resource to a cloud-based resource.

18. The method of claim 11, wherein the cloud-only processing mode operates to perform application processing operations solely using resources of a cloud-based computing environment.

19. A non-transitory computer-readable medium that includes instructions which, when executed, operate to adaptively process applications or application modules using edge-only resources, hybrid edge-cloud resources, and/or cloud-only resources by:

registering, by an authenticator, a subscriber for an edge processing service that utilizes edge resources to perform processing operations for an application or an application portion;

determining, for the registered subscriber, whether to utilize a cloud-only processing mode, a hybrid edge-cloud processing mode, or an edge-only processing mode, wherein the determining is based on at least two of a plurality of factors including: a customer subscription type parameter, a customer location parameter, a type of application parameter, a usage parameter, a time latency parameter, a power consumption parameter, an urgency of request parameter and/or a timing of request parameter, an estimated cloud travel time parameter and/or a processing cloud time parameter, and/or a security parameter; and performing processing operations for the application or the application portion according to one of the cloud-only processing mode, the hybrid edge-cloud processing mode, and the edge-only processing mode, wherein the determined processing mode can be changed by an edge manager or a cloud manager based on one or more business rules.

20. The computer-readable medium of claim 19, further comprising transmitting processing results from an edge resource to a cloud-based resource after processing operations conclude using the hybrid edge-cloud processing mode or the edge-only processing mode.

* * * * *